United States Patent
Zanka et al.

(10) Patent No.: US 7,064,160 B2
(45) Date of Patent: Jun. 20, 2006

(54) MOLDABILITY MODIFIER FOR POLYPROPYLENE RESIN AND POLYPROPYLENE RESIN COMPOSITION CONTAINING THE SAME

(75) Inventors: Yukihito Zanka, Mie (JP); Mitsuhiro Murayama, Mie (JP); Yoshiharu Yamamoto, Mie (JP)

(73) Assignee: Japan Polychem Corporation, Tokyo (JP)

( * ) Notice: Subject to any disclaimer, the term of this patent is extended or adjusted under 35 U.S.C. 154(b) by 15 days.

(21) Appl. No.: 10/416,182

(22) PCT Filed: Nov. 8, 2001

(86) PCT No.: PCT/JP01/09798

§ 371 (c)(1),
(2), (4) Date: May 9, 2003

(87) PCT Pub. No.: WO02/38671

PCT Pub. Date: May 16, 2002

(65) Prior Publication Data

US 2004/0014871 A1    Jan. 22, 2004

(30) Foreign Application Priority Data

Nov. 10, 2000   (JP)   ............... 2000-344122
Dec. 22, 2000   (JP)   ............... 2000-390161

(51) Int. Cl.
*C08J 3/00*   (2006.01)
*C08K 3/34*   (2006.01)
*C08L 23/00*   (2006.01)
*C08L 23/04*   (2006.01)
*C08L 53/00*   (2006.01)

(52) U.S. Cl. ............... 524/505; 524/451; 525/88; 525/191; 525/240

(58) Field of Classification Search ............ 525/191, 525/240, 88; 524/451, 505
See application file for complete search history.

(56) References Cited

FOREIGN PATENT DOCUMENTS

| | | | |
|---|---|---|---|
| EP | 0 903 356 | | 3/1999 |
| JP | 60-190409 | | 9/1985 |
| JP | 06-248155 | * | 6/1994 |
| JP | 6-248155 | | 9/1994 |
| JP | 6-329737 | | 11/1994 |
| JP | 7-53828 | | 2/1995 |
| JP | 07-196864 | * | 8/1995 |
| JP | 9-124736 | | 5/1997 |
| JP | 9-169826 | | 6/1997 |
| JP | 9-176406 | | 7/1997 |
| JP | 9-194646 | | 7/1997 |
| JP | 10-251329 | | 9/1998 |
| JP | 11-147923 | | 6/1999 |
| JP | 11-181025 | | 7/1999 |
| JP | 2000-86837 | | 3/2000 |
| WO | 98/54258 | | 12/1998 |

OTHER PUBLICATIONS

Patent Abstracts of Japan, JP 6-248155, Sep. 6, 1994.

* cited by examiner

*Primary Examiner*—Patrick D. Niland
(74) *Attorney, Agent, or Firm*—Oblon, Spivak, McClelland, Maier & Neustadt, P.C.

(57) ABSTRACT

The invention provides a polypropylene based resin composition, which has good moldability on injection molding and which is excellent in its flow mark appearance as well as weld appearance on molding, and suitable for injection-molded articles such as exterior parts of automobiles, and also provides a moldability modifier used for the composition.

The invention is a moldability modifier for a polypropylene based resin, which comprises at least one of a propylene homopolymer and a propylene random polymer having die swell ratio of 1.5 to 2.5 and ratio (Q value: Mw/Mn) of 7 to 13 of the weight average molecular weight (Mw) to the number average molecular weight (Mn) measured by gel permeation chromatography (GPC). The moldability modifier is mixed with a propylene-ethylene block copolymer, an ethylenic or styrenic elastomer, an inorganic filler, etc. to prepare a polypropylene based resin composition.

13 Claims, 1 Drawing Sheet

MOLDABILITY MODIFIER FOR POLYPROPYLENE RESIN AND POLYPROPYLENE RESIN COMPOSITION CONTAINING THE SAME

TECHNICAL FIELD

The present invention relates to a moldability modifier for a polypropylene based resin, which contains at least one of a propylene homopolymer and a propylene random polymer having a specific high die swell ratio and molecular weight distribution. The invention also relates to a polypropylene based resin composition containing this moldability modifier.

More specifically, the modifier can be effectively utilized in a polypropylene based resin composition containing a propylene-ethylene block copolymer component, an elastomer component and a filler component. Such a polypropylene based resin composition exhibits favorable moldability on injection molding and are excellent in its flow mark appearance (tiger stripe) and weld appearance, so that it is suitable for producing injection-molded articles such as exterior parts for automobiles and the like.

BACKGROUND ART

It has been widely known to use a polypropylene resin composition, which is obtained by compounding an ethylenic thermoplastic elastomer component such as an ethylene-propylene copolymer, ethylene-butene copolymer, etc. and an inorganic filler such as talc, etc. to a polypropylene resin, for producing automotive parts. Further, it has been proposed to improve moldability, mechanical properties and appearance by suitably selecting the kind of polypropylene resins, various rubber components and inorganic fillers depending on the purpose.

However, the materials containing these inorganic fillers generally have a tendency to cause poor molded appearance like tiger stripes, i.e., so-called flow marks, which spoils designs of the molded articles obtained. Meanwhile, as a method for improving such poor molded appearance, it is proposed to use a material having a wide molecular weight distribution in JP-A-2000-86837 and JP-A-6-248155 (The term "JP-A" as used herein means an "unexamined published Japanese patent application".). Further, in JP-A-9-176406, JP-A-9-194646 and JP-A-9-124736, a material obtained by using a propylene-ethylene block copolymer having a specific structure is proposed for improving flow marks.

However, the use of such a material having a wide molecular weight distribution can spoil weld appearances, though it improves the problem of flow marks. Thus, further improvement is required now.

JP-A-6-329737 discloses a propylene block copolymer which comprises a specific propylene component and a component consisting of propylene and other α-olefins. This copolymer is described to be easily molded and processed, to have excellent mechanical properties such as rigidity and tensile strength, transparency as well as surface appearance, and to raise molding rate.

Moreover, JP-A-7-53828 discloses a polypropylene resin composition comprising an ethylene-propylene block copolymer, a hydrogenated block copolymer, an elastomer and talc. The composition is described to be suitable for large-size automotive parts which are light and excellent in rigidity, heat distortion resistance, impact resistance, dimensional stability as well as appearance, and of which molding cycles are short. In JP-A-11-181025, a propylene-ethylene-1-butene polymer having a specific MFR, Q value, etc. is disclosed as a propylene type resin which is excellent in flexibility, transparency, heat resistance and moldability, and is improved in bleeding to the surfaces of its molded articles.

Even with these technologies, however, there has been a problem of the tendency to cause flow marks.

With an intention to solve this problem, the invention aims at providing a composition which is excellent in moldability, can give good appearance when molded, and therefore is suitable for exterior parts of automobiles such as bumpers, rocker panel, side crudding, over fenders, etc.

DISCLOSURE OF THE INVENTION

The present inventors have made extensive studies to solve the above problem. As a result, they found that the moldability and molded appearance characteristics of a polypropylene based resin composition can be controlled in good balance by compounding a propylene homopolymer or a propylene random polymer, which has a specific die swell ratio and a specific ratio (Mw/Mn:Q value) of the weight average molecular weight (Mw) to the number average molecular weight (Mn) measured by the GPC, to a propylene-ethylene block copolymer in a small amount as a moldability modifier rather than using the polymer itself as a molding material. The invention was established based on this finding.

Thus, the invention is achieved by the following (1) to (15).

(1) A moldability modifier for a polypropylene based resin, which comprises at least one of a propylene homopolymer and a propylene random polymer having die swell ratio of 1.5 to 2.5 and ratio (Q value:Mw/Mn) of 7 to 13 of the weight average molecular weight (Mw) to the number average molecular weight (Mn) measured by gel permeation chromatography (GPC).

(2) The moldability modifier for a polypropylene based resin as described in the item (1), which comprises the propylene homopolymer having die swell ratio of 1.5 to 2.5 and ratio (Q value:Mw/Mn) of 7 to 13 of the weight average molecular weight (Mw) to the number average molecular weight (Mn) measured by gel permeation chromatography (GPC).

(3) The moldability modifier for a polypropylene based resin as described in the item (1) or (2), wherein the propylene homopolymer has a melt flow rate (MFR) of 20 to 100 g/10 minutes.

(4) The moldability modifier for a polypropylene based resin as described in any one of the items (1) to (3), which comprises a propylene homopolymer produced by multistage polymerization.

(5) The moldability modifier for a polypropylene based resin as described in any one of the items (1) to (4) wherein the propylene homopolymer is a propylene homopolymer produced by multistage polymerization, and the polymerization amount and the melt flow rate (MFR) in the first polymerization stage is 50 to 95 wt % and 200 to 1,000 g/10 minutes, respectively.

(6) The moldability modifier for a polypropylene based resin as described in the item (1), which comprises the propylene random polymer having die swell ratio of 1.5 to 2.5 and ratio (Q value:Mw/Mn) of 7 to 13 of the weight average molecular weight (Mw) to the number average molecular weight (Mn) measured by gel permeation chromatography (GPC).

(7) The moldability modifier for a polypropylene based resin as described in the item (1) or (6), wherein the propylene random polymer has a melt flow rate (MFR) of 2 to 100 g/10 minutes.

(8) The moldability modifier for a polypropylene based resin as described in any one of the items (1), (6) and (7), wherein the propylene random polymer is a propylene random polymer produced by multistage polymerization, and the polymerization amount and the melt flow rate (MFR) in the first polymerization stage is 50 to 95 wt % and 100 to 500 g/10 minutes, respectively.

(9) The moldability modifier for a polypropylene based resin as described in any one of the items (1), (6), (7) and (8), wherein the propylene random polymer is a propylene random polymer of propylene and ethylene produced by multistage polymerization, and the ethylene content in the polymer obtained in the second or later polymerization stages is 1 to less than 10 wt %.

(10) A polypropylene based resin composition which comprises the following Components (A) and (B):
  Component (A): the moldability modifier for a polypropylene based resin as claimed in any one of claims 1 to 9:
    2 to 30 parts by weight; and
  Component (B): a propylene-ethylene block copolymer:
    70 to 98 parts by weight.

(11) The polypropylene based resin composition as described in the item (10), which further comprises the following Component (C):
  Component (C): an ethylenic or styrenic elastomer:
    1 to 40 parts by weight per 100 parts by weight of the total of Components (B) and (C)

(12) The polypropylene based resin composition as described in the item (10), which further comprises the following Component (D):
  Component (D): an inorganic filler:
    1 to 70 parts by weight per 100 parts by weight of the total of Components (A) and (B).

(13) The polypropylene based resin composition as described in the item (10), which further comprises the following Components (C) and (D):
  Component (C): an ethylenic or styrenic elastomer:
    1 to 40 parts by weight per 100 parts by weight of the total of Components (B) and (C),
  Component (D): an inorganic filler
    1 to 70 parts by weight per 100 part by weight of the total of Components (A), (B) and (C).

(14) The polypropylene based resin composition as described in the item (11) or (13), wherein the ethylenic or styrenic elastomer has a melt flow rate (MFR) of 0.3 to 80 g/10 minutes.

(15) The polypropylene based resin composition as described in the item (12) or (13), wherein the inorganic filler is talc.

BEST MODE FOR CARRYING OUT THE INVENTION

Constituting Components

Component (A): Moldability Modifier

Figure 1:
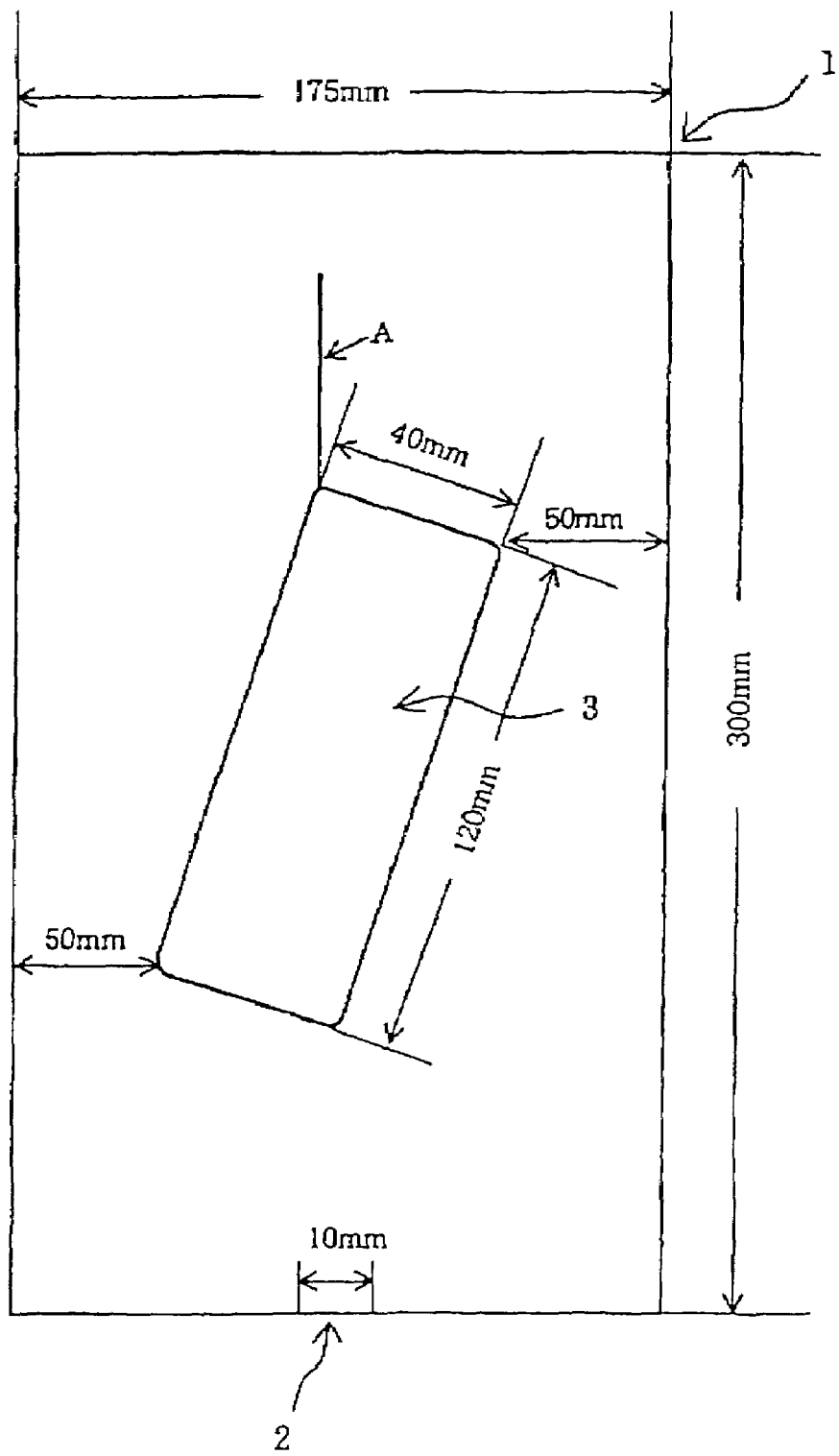
FIG. 1 illustrates a molded article for measuring the lengths of the weld lines in Examples. In the Figure, Reference Numeral 1 is a plate-form molded article, 2 is a gate, 3 is an opening and A is a weld line.

Component (A) of the invention is used for letting good flow mark appearance and good weld appearance exhibit themselves. This moldability modifier contains at least one of a propylene homopolymer and a propylene random polymer and has a die swell ratio of 1.5 to 2.5, preferably 1.6 to 2.4. The moldability modifier having a die swell ratio less than 1.5 is poor in improving the flow mark appearance, while the one having a die swell ratio over 2.5 is not practical since it is difficult to produce industrially and poor in its weld appearance. Another important property of the moldability modifier is the molecular weight distribution, which is expressed in terms of the ratio (Mw/Mn, i.e., Q value) of the weight average molecular weight (Mw) to the number average molecular weight (Mn). The Q value of the invention's modifier is selected from the range of from 7 to 13, preferably from 8 to 12. The modifier having a Q value less than 7 is insufficient in its improving effect and the resulting flow mark appearance is poor. On the other hand, the modifier having a Q value over 13 is also undesirable as it gives poor weld appearance.

In this connection, the die swell ratio in the invention is the value obtained by filling a polypropylene homopolymer or a propylene random polymer in a cylinder heated at 190° C., maintaining the temperature for 6 minutes, extruding the polymer from an orifice having a diameter of 1 mm and a length of 8 mm at a rate of 0.1 g/minute, measuring the diameter of the obtained strand, and calculating the ratio of the strand diameter to the orifice diameter.

As an additional property of the moldability modifier, the melt flow rate (MFR) is also important.

When the modifier is a propylene homopolymer, its MFR is usually selected from the range of from 20 to 100 g/10 minutes, preferably from 24 to 80 g/10 minutes. The MFR of less than 20 results in poor moldability on injection molding, while the MFR of over 100 gives poor impact characteristics and mechanical strength.

On the other hand, when the modifier is a propylene random polymer, its MFR is usually selected from the range of from 2 to 100 g/10 minutes, preferably from 24 to 80 g/10 minutes. The MFR of less than 2 results in poor moldability on injection molding, while the MFR of over 100 g/10 minutes gives poor impact characteristics and mechanical strength.

When the moldability modifier of the invention is a propylene random polymer, the comonomer copolymerized with propylene is not particularly limited, and examples thereof are α-olefins except propylene. Examples of such α-olefins include those having 2 to 20 carbon atoms except propylene, e.g., ethylene, butene-1, pentene-1, 3-methyl-1-butene, hexene-1, 3-methyl-1-pentene, 4-methyl-1-pentene, heptene-1, octene-1, nonene-1, decene-1, dodecene-1, tetradecene-1, hexadecene-1, octadecene-1, eicosene-1, etc. The α-Olefins may be copolymerized with propylene singly or as a combination of two or more. Of these, ethylene and butene-1, especially ethylene, are suitable.

The comonomer content is also not limited, and it is 1 to less than 10 wt %, preferably 2 to 9 wt %.

With respect to the mechanical properties, the composition obtained by using a propylene random polymer as a moldability modifier tends to be more excellent in impact characteristics and poorer in rigidity and heat resistance compared with the composition using a propylene homopolymer. Either a propylene homopolymer or a propylene random polymer is selected as a moldability modifier depending on the mechanical properties (balance of rigidity, heat resistance and impact characteristics), moldability (fluidity characteristics) and molded appearance (flow mark appearance and weld appearance) of the final polypropylene based resin composition.

Production methods of the propylene homopolymer or propylene random polymer as a moldability modifier are not particularly restricted, and can be suitably chosen from the known methods and conditions. As a polymerization catalyst for propylene, a highly stereoregular catalyst is usually used. For example, it can be a catalyst prepared by combining a titanium trichloride composition, which is obtained by reducing titanium tetrachloride with an organic aluminum compound and further treating it with various electron donors and electron acceptors, an organic aluminum compound and an aromatic carboxylic acid ester (cf. JP-A-56-100806, JP-A-56-120712 and JP-A-58-104907); a supported-type catalyst obtained by contacting halogenated magnesium with titanium trichloride and various electron donors (cf. JP-A-57-63310, JP-A-63-43915 and JP-A-63-83116); and the like.

The above homopolymer and polymer can be obtained by polymerizing propylene alone or propylene and a comonomer except propylene, mainly ethylene, in the presence of the aforementioned catalyst, according to such production processes as gas phase polymerization, liquid phase bulk polymerization, slurry polymerization, and the like. In order to obtain the propylene homopolymer or propylene random polymer having the above-mentioned die swell ratio, molecular weight distribution (Q value) and melt flow rate (MFR), it is preferable to produce it by multistage polymerization according to a slurry method or a gas phase fluid bed method.

As an example of the multistage polymerization, double-stage polymerization comprising the following Step (1) and Step (2) can be mentioned.

Step (1): Propylene is polymerized in the presence of hydrogen as a molecular weight controller. This is for inhibiting the formation of a polymer having a too large molecular weight. When the moldability modifier is a propylene homopolymer, hydrogen is added so as to make the MFR of the polymer obtained in the first polymerization stage to be 200 to 1,000 g/10 minutes, preferably 300 to 600 g/10 minutes. Whereas, in the case of the moldability modifier being a propylene random polymer, hydrogen is added so as to make the MFR of the polymer obtained in the first polymerization stage to be 100 to 500 g/10 minutes, preferably 130 to 300 g/10 minutes. The hydrogen concentration is usually selected from the range of from 0.5 to 40 vol %, preferably from 1 to 30 vol %.

In addition, the polymerization temperature and pressure are usually selected from the ranges of from 40 to 90° C. and from $2\times10^5$ to $35\times10^5$ Pa, respectively. The amount of the polymer obtained in this Step (1) is usually adjusted to be 50 to 95 wt %, preferably 60 to 90 wt %, based on the total polymerization amount. In case the amount of the polymer produced in Step (1) is less than 50 wt %, an excessive amount of a high molecular polypropylene polymer or propylene random polymer is produced in Step (2), which deteriorates the properties as a moldability modifier.

Step (2): It is preferred that the polymerization is carried out in an atmosphere of hydrogen at a concentration as low as possible or in a state of substantially no presence of hydrogen in order to polymerize a high molecular weight polypropylene polymer or propylene random polymer. The polymerization is continued in the presence of the polypropylene formed in Step (1) and a catalyst. In the case of a propylene random polymer, it is desirable that the comonomer, especially ethylene, is supplied to the reaction system in such a way that the amount thereof becomes 1 to less than 10 wt %, preferably 2 to 9 wt %, in the polymer obtained in Step (2). The temperature and pressure are usually selected from the ranges of from 40 to 90° C. and from $2\times10^5$ to $35\times10^5$ Pa, respectively. The amount of the polymer obtained in this Step (2) is adjusted to be 5 to 50 wt %, preferably 10 to 40 wt %, based on the total polymerization amount. Step (1) and Step (2) can be combined in any way as far as the physical property values of the entire polymer obtained are adjusted to be within the above ranges.

Component (B): Propylene-Ethylene Block Copolymer

Component (B) of the invention is a main component of the polypropylene based resin composition and a resin component to be a skeleton. As a polypropylene based resin, a propylene-ethylene block copolymer is used. The method for producing this copolymer is not particularly restricted, and any known methods can be applied or marketed products thereof can be used as they are.

The propylene-ethylene block copolymer is a block copolymer containing a crystalline polypropylene portion (Unit A portion) and an ethylene-propylene random copolymer portion (Unit B portion). The above Unit A portion is a crystalline product obtained usually by homopolymerizing propylene or, as the case may be, by copolymerizing propylene with a small amount of other α-olefin. This portion is preferred to be high in its density. The crystallinity of Unit A portion is usually 90% or higher, preferably 95 to 100%, in terms of the isotactic index (insoluble part obtained by extraction with boiling n-heptane). In case the crystallinity is low, the resulting propylene-ethylene block copolymer is poor in its mechanical strength, especially in its modulus of elasticity in bending. Also, the MFR of Unit A portion is usually about 5 to 400 g/10 minutes.

On the other hand, the above Unit B portion is a rubber-like component obtained by carrying out random copolymerization of propylene and ethylene. The ethylene content in Unit B portion is usually 10 to 80 wt %, preferably 20 to 70 wt %, in terms of ethylene/(ethylene+propylene). In case the ethylene content is less than the above range, the impact resistance can not be sufficiently improved. When it is exceeding the range, the rigidity is poor. The MFR of Unit B portion is usually about 0.01 to 10 g/10 minutes.

The amount of Unit A portion is usually adjusted to be 50 to 95 wt %, preferably 60 to 90 wt %, and that of Unit B portion to be 5 to 50 wt %, preferably 10 to 40 wt %, based on the total polymerization amount, respectively. Unit A portion does not cause elution at 100° C. or lower when extracted with ortho-dichlorobenzene, while Unit B portion easily does. Therefore, with respect to the polymer produced, the composition of the propylene-ethylene block copolymer can be determined by this extraction and analysis with ortho-dichlorobenzene.

The propylene-ethylene block copolymer containing Unit A portion and Unit B portion is to have as a whole a MFR of 2 to 200 g/10 minutes, a die swell ratio of 0.98 to 1.2 and a Q value of 3 to less than 7.

For the production of these propylene-ethylene block copolymers, a highly stereoregular catalyst is used. The catalyst and polymerization method for the copolymers are the same as those described in the above production of Component (A), i.e., moldability modifier. In the production of a propylene-ethylene block copolymer having a high content of Unit B portion, it is preferred to use a gas phase fluid bed method.

In the latter stage reaction, sticking and blocking problems can be avoided and polymerization workability can be improved by newly adding an electron donor compound.

Component (C): Ethylenic or Styrenic Elastomer

This elastomer is a component randomly incorporated in the propylene-ethylene block copolymer together with the moldability modifier of the invention to prepare a polypropylene resin composition.

Specific examples of the usable elastomer component include ethylenic elastomers such as an ethylene-α-olefin copolymer elastomer, e.g., an ethylene-propylene copolymer (ethylene-propylene rubber: EPR), ethylene-butene copolymer (EBR), ethylene-hexene copolymer (EHR), ethylene-octene copolymer (EOR), etc. and an ethylene-α-olefin-diene terpolymer elastomer (EPDM), i.e., an ethylene-propylene-ethylydene norbornene copolymer, ethylene-propylene-butadiene copolymer, ethylene-propylene-isoprene copolymer, etc.; and styrenic elastomers such as hydrogenated compounds of a styrene-butadiene-styrene triblock copolymer (SEBS), styrene-isoprene-styrene triblock copolymer or styrene-butadiene-styrene triblock copolymer, and hydrogenated compounds of a styrene-isoprene-styrene triblock copolymer (SEPS), etc.

In this connection, the above-mentioned hydrogenated compound of the styrene-butadiene-styrene triblock copolymer is styrene-ethylene-butene-styrene when the polymer's main chain is described in terms of the monomer units, so that it is generally abbreviated as SEBS.

These Component (C) elastomers maybe used as a mixture of two or more.

The ethylenic elastomers (sometimes broadly called as olefinic elastomers) are produced by polymerizing each monomer in the presence of a catalyst. Examples of the usable catalyst include a titanium compound such as halogenated titanium; an organic aluminum-magnesium complex such as an alkylaluminum-magnesium complex; the so-called Ziegler type catalyst such as alkylaluminum, alkylaluminum chloride, etc.; and a mtallocene compound as described in WO-91/04257, etc. As a method for polymerization, such production processes as a gas phase fluid bed method, solution method, slurry method, etc. can be applied. As examples of the marketed products, EP series and EBM series produced by JSR Corp., TAFMER P series and TAFMER A series produced by Mitsui Chemicals, Inc. and Engage EG series produced by DuPont Dow Co. can be mentioned. Any of these products can be used in the invention.

The production of hydrogenated products of triblock copolymers (SEBS and SEPS) among styrenic elastomers is briefly described hereinafter. These triblock copolymers can be produced according to a generally used anionic living polymerization, which includes a method of successively polymerizing styrene, butadiene and styrene to obtain a triblock copolymer and hydrogenate it (production process of SEBS) and a method of producing a styrene-butadiene diblock copolymer first, obtaining a triblock copolymer from it by using a coupling agent and hydrogenating the triblock copolymer. By using isoprene instead of butadiene here, a hydrogenated product of a styrene-isoprene-styrene triblock copolymer (SEPS) can be produced in the same manner.

The melt flow rate (MFR: 230° C. with a load of 2.16 kg) of these Component (C) elastomers are preferably within the range of from 0.5 to 150 g/10 minutes, preferably from 0.7 to 100 g/10 minutes, and more preferably from 0.7 to 80 g/10 minutes, in consideration of the invention's main use, i.e., exterior materials for automobiles.

Component (D): Inorganic Filler

The inorganic filler is a component randomly incorporated like the elastomer component when the invention's moldability modifier is incorporated in the propylene-ethylene block copolymer to prepare a polypropylene resin composition. The filler is used for improving the modulus of elasticity in bending and lowering the coefficient of linear expansion of the composition.

The inorganic filler of the invention is not particularly restricted in its composition, form, etc. Any of the marketed fillers for polymers can be used.

Specific examples thereof include tabular fillers such as talc, mica, montmorillonite, etc.; fibrous fillers such as short fiber glass fiber, long fiber glass fiber, carbon fiber, aramide fiber, alumina fiber, boron fiber, zonolite, etc.; whisker fillers such as potassium titanate, magnesium oxysulfate, silicon nitride, aluminum borate, basic magnesium sulfate, zinc oxide, wollastonite, calcium carbonate, etc.; granulated fillers such as precipitated calcium carbonate, heavy calcium carbonate, magnesium carbonate, etc.; and balloon filler such as glass balloon. Of these, talc is particularly preferred in view of the balance of properties and costs.

With respect to talc that is most preferable as a filler, it is to have an average particle size of 10 μm or less, preferably 0.5 to 8 μm.

The average particle size can be obtained from the particle size value of the cumulative amount of 50 wt %, which is read from the cumulative distribution curve of particle sizes measured by a laser diffraction method (e.g., LA920W produced by Horiba, Ltd.) or a light transmission method based on a liquid phase sedimentation (e.g., CP model produced by Shimadzu Corp., etc.). The measured values in the invention's Examples were obtained by the former method.

Such talc is prepared by mechanically finely grinding natural talc and further precisely classifying the ground talc once or many times. As a grinder, a jaw crusher, hammer crusher, roll crusher, screen mill, jet grinder, colloid mill, roller mill, vibrating mill, and the like can be used.

The talc particles thus produced is subjected to wet classification or dry classification once or repeatedly by using such an apparatus as a cyclone, cyclone air separator, micro separator, cyclone air separator, sharp cut separator, etc. in order to adjust its average particle size according to the invention. It is preferable to grind talc into a specific particle size first and then classify it using a sharp cut separator.

For the purpose of improving the adhesive property with a polymer or dispersibility, these talc particles may be surface-treated with various organic titanate type coupling agents, organic silane coupling agents, modified polyolefins grafted with unsaturated carboxylic acid or its anhydride, fatty acid, metal salts of fatty acid, fatty acid ester, and the like.

(E) Additional Component (Optional Components)

Other than the above Components (A) to (D), additional components (optional components) can be added to the invention's polypropylene based resin composition as far as they do not badly impair the effect of the invention.

Examples of such additional components (optional components) include a phenolic or phosphoric antioxidant, a hindered amine type, benzophenone type or benzotriazole type anti-weathering/anti-deterioration agent, a nucleating agent such as an organic aluminum compound, organic phosphorus compound, etc., a dispersing agent represented by a metal salt of stearic acid, and a coloring substance such as quinacridone, perylene, phthalocyanine, titanium oxide, carbon black, etc.

Production of Polypropylene Type Resin Composition (1) Compounding Ratio

The polypropylene based resin composition of the invention is produced by combining the above Components (A) to (E). Representative examples are a composition of (A) and (B), composition of (A), (B) and (C), composition of (A), (B) and (D), and composition of (A), (B), (C) and (D), and more preferably, Component (E) is incorporated.

With respect to the composition of (A) and (B) Moldability Modifier (A) is usually used in an amount of 2 to 30 parts by weight, preferably 5 to 25 wt %, and especially preferably 10 to 23 wt %, and Propylene-Ethylene Block Copolymer (B) is usually used in an amount of 70 to 98 parts by weight, preferably 75 to 95 wt %, and especially preferably 77 to 90 wt %. In case Moldability Modifier (A) is in an amount less than the above, its effect to improve molded appearance is poor. On the other hand, the amount exceeding the above ranges deteriorates weld appearance.

With respect to the composition of (A), (B) and (C), the contents of Components (A) and (B) are the same as above. Component (C) is usually used in an amount of 1 to 40 parts by weight, preferably 2 to 30 parts by weight, and especially preferably 3 to 20 parts by weight, based on the total 100 parts by weight of Components (B) and (C). In case Elastomer (C) is in an amount of less than the above, the effect of its addition is not sufficiently exhibited. While, the amount exceeding the above ranges may cause rigidity deterioration and a cost problem. However, there are various combinations depending on the purpose and intended use, and the combinations are not restricted to the above. It is also important to choose the kind of the elastomer according to the purpose.

With respect to the composition of (A), (B) and (D) the contents of Components (A) and (B) are the same as above. Component (D) is usually used in an amount of 1 to 70 parts by weight, preferably 2 to 50 parts by weight, and especially preferably 5 to 40 parts by weight, based on the total 100 parts by weight of Components (A) and (B). In case Inorganic Filler (D) is in an amount of less than the above, the effect of its addition can not be sufficiently exhibited and results in poor modulus of elasticity in bending. On the contrary, the amount exceeding the above ranges deteriorates brittle temperature as well as moldability.

With respect to the composition of (A), (B), (C) and (D), the contents of Components (A) and (B) are the same as above. Component (C) is usually used in an amount of 1 to 40 parts by weight, preferably 2 to 30 parts by weight, and especially preferably 3 to 20 parts by weight, based on the total 100 parts by weight of Components (B) and (C). Component (D) is usually used in an amount of 1 to 70 parts by weight, preferably 2 to 50 parts by weight, and especially preferably 5 to 40 parts by weight, based on the total 100 parts by weight of Components (A), (B) and (C).

(2) Kneading

The above-described constituting components are kneaded in the above compounding ratios at 180 to 250° C. using an ordinary kneading machine such as an extruder, Banbury mixer, rolls, Brabender plastograph, a kneader and the like. Of these, an extruder, especially a biaxial extruder, is preferably used.

Molding Processing of Polypropylene Type Resin Composition

The polypropylene based resin composition of the invention is processed into desired molded articles. The method for this is not particularly restricted, and various molding methods are used depending on the purposes. For example, injection molding and extrusion molding can be applied. A large-scale injection molding gives excellent effects in moldability, flow mark appearance (tiger stripe) and weld appearance.

Thus, the composition is suitable for exterior parts of automobiles including bumpers, rocker panel, side crudding, over fenders, etc.

EXAMPLE

The invention is to be described further in detail by way of Examples. However, the invention is not restricted by the following Examples as far as it is within the scope of its purpose. Properties were measured according to the following methods.

Q Value:

Weight average molecular weight (Mw) and number average molecular weight (Mn) were measured by using a GCP apparatus (manufactured by Millipore Corp.) equipped with an infrared detector, and the Mw/Mn was calculated. The measurement was carried out by using orthodichlorobenzene as a mobile phase solvent and a high density polyethylene having a Mn 18,000 and MW 52,200 as a standard substance and setting the temperature of the column and sample inlet section at 140° C.

Melt Flow Rate (MFR):

Melt flow rate was measured with a load of 2.16 Kg at a temperature of 230° C. according to ASTM-D1238.

(3) Flow Mark Generation Distance:

A piece of sheet having a size of 350 mm×100 mm×2 mmt was molded by an injection molding machine with a clamping pressure of 170 tons at a molding temperature of 220° C., and the distance of the flow marks generation was measured with the eye. Measuring standards were as below:
 Generation distance of over 200 mm ⊙
 Generation distance of over 150 mm to 200 mm or less ○
 Generation distance of over 100 mm to 150 mm or less Δ
 Generation distance of 100 mm or less x (4) Length of Weld Line A plate-formed molded article as a sample having a size of 300 mm×175 mm×4 mmt was prepared by injection-molding the composition at 220° C. through an opening of 10 mm in diameter using an injection molding machine with a clamping pressure of 170 tons. The length of Portion A in FIG. 1 was measured. The judging standards were as below:
 Length of the weld line less than 30 mm ○
 Length of the weld line over 30 mm x (5) Izod Impact Strength Evaluated at 23° C. according to JIS-K-7110.

Preparation of Base Resin

To a compound comprising 85 parts by weight of a propylene-ethylene block copolymer (produced by Japan Polychem Corp., Trade Name: Novatec PP-BC03GS, MFR=30) and 15 parts by weight of an ethylene-butene random copolymer rubber (produced by Mitsui Chemicals, Inc., Trade Name: TAFMER YA503), 0.1 part by weight of tetrakis[methylene-3-(3'5'-di-t-butyl-4'-hydroxyphenyl)propionate]methane (produced by Ciba-Geigy, Ltd., Trade Name: Irganox 1010) and 0.05 part by weight of tris(2,4-di-t-butylphenyl)phosphite (produced by Ciba-Geigy, Ltd., Trade Name: Irgaphos 168) as an antioxidant were compounded. The resulting composition was mixed for 5 minutes by a Henschel mixer followed by kneading and granulating by an biaxial kneading machine (2FCM manufactured by Kobe Steel, Ltd.) at a temperature set at 210° C. to obtain a thermoplastic resin composition (Base Material 1).

In the same manner, a thermoplastic resin composition (Base Material 2) was obtained by using a compound comprising 75 parts by weight of a propylene-ethylene block copolymer (produced by Japan Polychem Corp., Trade Name: Novatec PP-BC03GS, MGR=30) and 25 parts by weight of an ethylene-butene random copolymer rubber (produced by Mitsui Chemicals, Inc., Trade Name: TAFMER YA503).

Also, in the same manner, a thermoplastic resin composition (Base Material 3) was obtained by using a compound comprising 85 parts by weight of a propylene-ethylene block copolymer (produced by Japan Polychem Corp., Trade Name: Novatec PP-BC03GS, MFR=30) and 15 parts by weight of an ethylene-octene random copolymer rubber (produced by DuPont Dow, Trade Name: Engage EG8200).

Property values of the moldability modifier for a propylene homopolymer and the moldability modifier for a propylene random polymer used in Examples and Comparative Examples are shown in Table 1 and Table 2, respectively. The method for producing each modifier is as follows:

Production Method of Modifiers A-1 to A-5: Propylene Homopolymers

60 Liters of n-heptane, 5 g of a magnesium-supported titanium catalyst and 15 g of triethyl aluminum were added in a stainless steel autoclave having an inner volume of 200 l and heated to 75° C. Hydrogen and propylene were provided thereto to produce a propylene homopolymer having a MFR of 750 g/10 minutes (first stage polymerized portion) in an amount of 70 wt % based on the total weight.

After the completion of the first stage polymerization, hydrogen was purged. Then, only propylene was provided in the presence of the first stage polymerized portion to prepare a propylene homopolymer having a weight average molecular weight of 3,500,000 as a second stage polymerized portion in an amount of 30 wt % based on the total weight.

The MFR of the whole propylene homopolymer obtained in this two-stage polymerization (A-1 in Table 1) was 42.2 g/10 minutes.

By changing the providing amounts of propylene and hydrogen and polymerization time, A-2 to A-5 were produced in the same manner as above. A-4 was obtained without carrying out the two-stage polymerization.

Production Method of Modifiers A'-1 to A'-4: Propylene Random Polymer

60 Liters of n-heptane, 5 g of a magnesium-supported titanium catalyst and 15 g of triethyl aluminum were added in a stainless steel autoclave having an inner volume of 200 l and heated to 75° C. Hydrogen and propylene were provided thereto to produce a propylene homopolymer having a MFR of 150 g/10 minutes (first stage polymerized portion) in an amount of 70 wt % based on the total weight.

After the completion of the first stage polymerization, hydrogen was purged. Then, a gas mixture of propylene and ethylene (an ethylene content of 6 wt %) was provided in the presence of the first stage polymerized portion to prepare a propylene random polymer in an amount of 30 wt % based on the total weight.

The MFR of the whole propylene random polymer obtained in this two-stage polymerization (A'-1 in Table 2) was 4.5 g/10 minutes.

By changing the providing amounts of propylene and hydrogen and polymerization time, A'-2 to A'-4 were produced in the same manner as above. A'-4 was obtained without carrying out the two-stage polymerization.

Examples 1 to 3

The modifier shown in Table 1 and the base resin and inorganic filler shown in Table 3 were compounded in the compounding ratio as shown in Table 3. To this composition, 0.1 part by weight of tetrakis[methylene-3-(3'5'-di-t-butyl-4'-hydroxyphen yl)propionate]methane (produced by Ciba-Geigy, Ltd., Trade Name: Irganox 1010) and 0.1 part by weight of calcium stearate were further added and mixed for 5 minutes by a super mixer manufactured by Kawata Corp. The resulting mixture was kneaded and granulated at 210° C. by a biaxial kneader (2FCM manufactured by Kobe Steel, Ltd.) to obtain a polypropylene based resin composition. Talc 1 used as an inorganic filler was MT7 produced by Fuji Talc Industrial Co., Ltd., which had an average grain size of 7 μm.

The obtained polypropylene based resin composition was evaluated on its properties (MFR, distance of generated flow marks and length of weld line). The evaluation results are shown in Table 3.

The measured Izod impact strength in Example 2 was 17 Kg·cm/cm.

Comparative Examples 1 to 5

In the same manner as that in Example 1, a polypropylene based resin composition was prepared by using the modifier, base resin and inorganic filler shown in Table 1 in the composition shown in Table 4. The obtained polypropylene type composition was evaluated on its properties (MFR, distance of generated flow marks and length of weld line). The evaluation results are shown in Table 4.

Examples 4 to 9

The modifier shown in Table 2 and the base resin and inorganic filler shown in Table 5 were compounded in the compounding ratio as shown in Table 5. To this composition, 0.1 part by weight of tetrakis[methylene-3-(3'5'-di-t-butyl-4'-hydroxyphen yl)propionate]methane (produced by Ciba-Geigy, Ltd., Trade Name: Irganox 1010) and 0.1 part by weight of calcium stearate were further added and mixed for 5 minutes by a super mixer manufactured by Kawata Corp. The resulting mixture was kneaded and granulated at 210° C. by a biaxial kneader (2FCM manufactured by Kobe Steel, Ltd.) to obtain a polypropylene based resin composition.

The obtained polypropylene type composition was evaluated on its properties (MFR, distance of generated flow marks, length of weld line and IZOD impact strength). The evaluation results are shown in Table 5.

Comparative Example 6 to 8

In the same manner as that in Example 4, a polypropylene based resin composition was prepared by using the modifier, base resin and inorganic filler shown in Table 2 in the composition shown in Table 6. The obtained polypropylene type composition was evaluated on its properties (MFR, distance of generated flow marks, length of weld line and Izod impact strength). The evaluation results are shown in Table 6.

TABLE 1

Modifier/Propylene Homopolymer

| Kind | First Stage Polymerization MFR (g/10 min.) | Second Stage Polymerization Ratio (wt %) | Total Modifier MFR (g/10 min.) | Die Swell Ratio | Q Value (Mw/Mn) |
|---|---|---|---|---|---|
| A-1 | 750 | 30 | 42.2 | 2.13 | 10.4 |
| A-2 | 318 | 30 | 24 | 1.62 | 8.4 |
| A-3 | 300 | 20 | 53 | 1.3 | 8.2 |
| A-4 | 45 | 0 | 45 | 1.2 | 4 |
| A-5 | 300 | 48 | 4.8 | 2.3 | 16 |

TABLE 2

Modifier/Propylene Random Polymer

| Kind | First Stage Polymerization MFR (g/10 min.) | Second Stage Polymerization Ratio (wt %) | Ethylene Amount (wt %) | Total Modifier MFR (g/10 min.) | Die Swell Ratio | Q Value (Mw/Mn) |
|---|---|---|---|---|---|---|
| A'-1 | 150 | 30 | 6 | 4.5 | 2 | 11.2 |
| A'-2 | 300 | 30 | 6 | 7.1 | 1.9 | 8.7 |
| A'-3 | 150 | 20 | 6 | 23.8 | 1.7 | 10.2 |
| A'-4 | 25 | 0 | 0 | 25 | 0.9 | 2.9 |

TABLE 3

| | A Modifier | | B + (C) Base Resin | | D Filler | | MFR | Property Evaluation | | | |
|---|---|---|---|---|---|---|---|---|---|---|---|
| | | | | | | | | Distance of Generated Flow Marks | | Length of Weld Line | |
| | Kind | wt % | Kind | wt % | Kind | wt % | (g/10 min.) | mm | Judgement | mm | Judgement |
| Ex. 1 | A-1 | 20 | Base Material 1 | 70 | Talc 1 | 10 | 26.1 | 270 | ◉ | 24 | ○ |
| Ex. 2 | A-2 | 20 | Base Material 1 | 70 | Talc 1 | 10 | 23.1 | 200 | ○ | 10 | ○ |
| Ex. 3 | A-1 | 10 | Base Material 1 | 80 | Talc 1 | 10 | 24 | 210 | ◉ | 14 | ○ |

TABLE 4

| | A Modifier | | B + (C) Base Resin | | D Filler | | MFR | Property Evaluation | | | |
|---|---|---|---|---|---|---|---|---|---|---|---|
| | | | | | | | | Distance of Generated Flow Marks | | Length of Weld Line | |
| | Kind | wt % | Kind | wt % | Kind | wt % | (g/10 min.) | mm | Judgement | mm | Judgement |
| Comp. Ex. 1 | None | 0 | Base Material 1 | 90 | Talc 1 | 10 | 23 | 93 | X | 8 | ○ |
| Comp. Ex. 2 | A-1 | 40 | Base Material 1 | 50 | Talc 1 | 10 | 28.3 | 285 | ◉ | 35 | X |
| Comp. Ex. 3 | A-4 | 20 | Base Material 1 | 70 | Talc 1 | 10 | 26.1 | 98 | X | 9 | ○ |
| Comp. Ex. 4 | A-5 | 20 | Base Material 1 | 70 | Talc 1 | 10 | 15.8 | 290 | ◉ | 40 | X |
| Comp. Ex. 5 | A-3 | 20 | Base Material 1 | 70 | Talc 1 | 10 | 27.2 | 130 | Δ | 9 | ○ |

TABLE 5

| | A Modifier | | B + (C) Base Resin | | D Filler | | | Property Evaluation | | | | |
|---|---|---|---|---|---|---|---|---|---|---|---|---|
| | | | | | | | MFR | Distance of Generated Flow Marks | | Length of Weld Line | | Izod Impact Strength |
| | Kind | wt % | Kind | wt % | Kind | wt % | (g/10 min.) | mm | Judgement | mm | Judgement | kg · cm/cm |
| Ex. 4 | A'-1 | 20 | Base Material 1 | 70 | Talc 1 | 10 | 16.5 | 275 | ⊚ | 22 | ○ | 46 |
| Ex. 5 | A'-2 | 10 | Base Material 1 | 80 | Talc 1 | 10 | 19.8 | 250 | ⊚ | 19 | ○ | 43 |
| Ex. 6 | A'-1 | 5 | Base Material 1 | 85 | Talc 1 | 10 | 20.8 | 155 | ○ | 10 | ○ | 58 |
| Ex. 7 | A'-3 | 10 | Base Material 1 | 80 | Talc 1 | 10 | 23.3 | 160 | ○ | 10 | ○ | 51 |
| Ex. 8 | A'-1 | 10 | Base Material 2 | 80 | Talc 1 | 10 | 14.3 | 190 | ○ | 23 | ○ | 54 |
| Ex. 9 | A'-1 | 10 | Base Material 3 | 80 | Talc 1 | 10 | 20.2 | 230 | ⊚ | 25 | ○ | 50 |

TABLE 6

| | A Modifier | | B + (C) Base Resin | | D Filler | | | Property Evaluation | | | | |
|---|---|---|---|---|---|---|---|---|---|---|---|---|
| | | | | | | | MFR | Distance of Generated Flow Marks | | Length of Weld Line | | Izod Impact Strength |
| | Kind | wt % | Kind | wt % | Kind | wt % | (g/10 min.) | mm | Judgement | mm | Judgement | kg · cm/cm |
| Comp. Ex. 6 | None | 0 | Base Material 1 | 90 | Talc 1 | 10 | 23 | 93 | X | 8 | ○ | 58 |
| Comp. Ex. 7 | A'-1 | 33 | Base Material 1 | 57 | Talc 1 | 10 | 12 | 290 | ⊚ | 37 | X | 50 |
| Comp. Ex. 8 | A'-4 | 10 | Base Material 1 | 80 | Talc 1 | 10 | 23.8 | 97 | X | 7 | ○ | 38 |

INDUSTRIAL APPLICABILITY

As has been described, the moldability modifier for a propylene type resin and the polypropylene based resin composition according to the invention exhibit a favorable moldability on injection molding, and are excellent in their flow mark appearance (tiger stripe) and weld appearance at the time of molding. Thus, they are suitable for the production of injection-molded articles such as exterior parts for automobiles and the like. Specifically, according to the invention, the distance of generated flow marks can be easily adjusted to 150 mm or more, preferably 180 mm or more, and more preferably over 200 mm, and the length of weld line to 30 mm or less, preferably 20 mm or less.

The invention claimed is:

1. A polypropylene based resin composition which comprises the following Components (A) and (B):

from 2 to 30 parts by weight of a component (A) which is a moldability modifier for a polypropylene based resin which comprises:

a propylene random polymer having a die swell ratio of 1.5 to 2.5 and a ratio (Q value: Mw/Mn) of 7 to 13 of the weight average molecular weight (Mw) to the number average molecular weight (Mn) measured by gel permeation chromatography (GPC), and;

from 70 to 98 parts by weight of a component (B) which is a propylene-ethylene block copolymer.

2. The polypropylene based resin composition as claimed in claim 1, wherein the propylene random polymer has a melt flow rate (MFR), as determined under a load of 2.16 kg at a temperature of 230° C. by the procedure of ASTM-D1238, of 2 to 100 g /10 minutes.

3. The polypropylene based resin composition as claimed in claim 1, wherein the propylene random polymer is a propylene random polymer produced by multistage polymerization, and the polymerization amount and the melt flow rate (MFR), as determined under a load of 2.16 kg at a temperature of 230° C. by the procedure of ASTM-D1238, in the first polymerization stage are 50 to 95 wt % and 100 to 500 g/10 minutes, respectively.

4. The polypropylene based resin composition as claimed in claim 1, wherein the propylene random polymer is a propylene random polymer produced by multistage polymerization, and the polymerization amount and the melt flow rate (MFR), as determined under a load of 2.16 kg at a temperature of 230° C. by the procedure of ASTM-D1238, in the first polymerization stage are 50 to 95 wt % and 100 to 500 g/10 minutes, respectively.

5. The polypropylene based resin composition as claimed in claim 1, wherein the propylene random polymer is a propylene random polymer of propylene and ethylene produced by multistage polymerization, and the ethylene content in the polymer obtained in the second or later polymerization stages is 1 to less than 10 wt %.

6. The polypropylene based resin composition as claimed in claim 1, wherein the propylene random polymer is a propylene random polymer of propylene and ethylene produced by multistage polymerization, and the ethylene content in the polymer obtained in the second or later polymerization stages is 1 to less than 10 wt %.

7. The polypropylene based resin composition as claimed in claim 1, which further comprises the following Component (C):

from 1 to 40 parts by weight per 100 parts by weight of the total of Components (B) and (C) of component (C) which is an ethylenic or styrenic elastomer.

8. The polypropylene based resin composition as claimed in claim 1, which further comprises the following Component (D):

from 1 to 70 parts by weight per 100 parts by weight of the total of Components (A) and (B), of a component (D) which is an inorganic filler.

9. The polypropylene based resin composition as claimed in claim 1, which further comprises the following Components (C) and (D):

from 1 to 40 parts by weight per 100 parts by weight of the total of Components (B) and (C), of a component (C) which is an ethylenic or styrenic elastomer, and from 1 to 70 parts by weight per 100 parts by weight of the total of Components (A), (B) and (C), of a component (D) which is an inorganic filler.

10. The polypropylene based resin composition as claimed in claim 7, wherein the ethylenic or styrenic elastomer has a melt flow rate (MFR), as determined under a load of 2.16 kg at a temperature of 230° C. by the procedure of ASTM-D1238, of 0.3 to 80 g/10 minutes.

11. The polypropylene based resin composition as claimed in claim 9, wherein the ethylenic or styrenic elastomer has a melt flow rate (MFR), as determined under a load of 2.16 kg at a temperature of 230° C. by the procedure of ASTM-D1238, of 0.3 to 80 g/10 minutes.

12. The polypropylene based resin composition as claimed in claim 9, wherein the inorganic filler is talc.

13. The polypropylene based resin composition as claimed in claim 8, wherein the inorganic filler is talc.

* * * * *